United States Patent
Malouin et al.

(10) Patent No.: US 8,126,337 B2
(45) Date of Patent: Feb. 28, 2012

(54) BALANCED PHASE-SHAPED BINARY TRANSMISSION IN OPTICAL COMMUNICATIONS

(75) Inventors: Christian Malouin, San Jose, CA (US); Theodore J. Schmidt, Gilroy, CA (US)

(73) Assignee: Opnext Subsystems, Inc., San Jose, CA (US)

( * ) Notice: Subject to any disclaimer, the term of this patent is extended or adjusted under 35 U.S.C. 154(b) by 662 days.

(21) Appl. No.: 12/253,198

(22) Filed: Oct. 16, 2008

(65) Prior Publication Data

US 2009/0136240 A1     May 28, 2009

Related U.S. Application Data

(60) Provisional application No. 60/980,441, filed on Oct. 16, 2007.

(51) Int. Cl.
*H04B 10/04* (2006.01)
*H04B 10/06* (2006.01)

(52) U.S. Cl. ........ 398/188; 398/198; 398/202; 398/207; 359/279; 359/325

(58) Field of Classification Search ............... 398/149, 398/183, 188, 198, 201, 202, 207, 212, 214; 359/279, 325
See application file for complete search history.

(56) References Cited

U.S. PATENT DOCUMENTS

| | | |
|---|---|---|
| 2003/0175036 A1 | 9/2003 | Mamyshev et al. |
| 2005/0111851 A1* | 5/2005 | Kim et al. ............... 398/161 |
| 2007/0047954 A1* | 3/2007 | Mamyshev ............... 398/33 |

OTHER PUBLICATIONS

International Search Report and Written Opinion dated May 27, 2009 for International Application No. PCT/US2008/080237, filed Oct. 16, 2008 (7 pages).

* cited by examiner

*Primary Examiner* — M. R. Sedighian
(74) *Attorney, Agent, or Firm* — Fish & Richardson P.C.

(57) ABSTRACT

Optical communication apparatus, methods, systems are provided based on balanced-detection phase-shaped binary transmission (BD-PSBT).

15 Claims, 8 Drawing Sheets

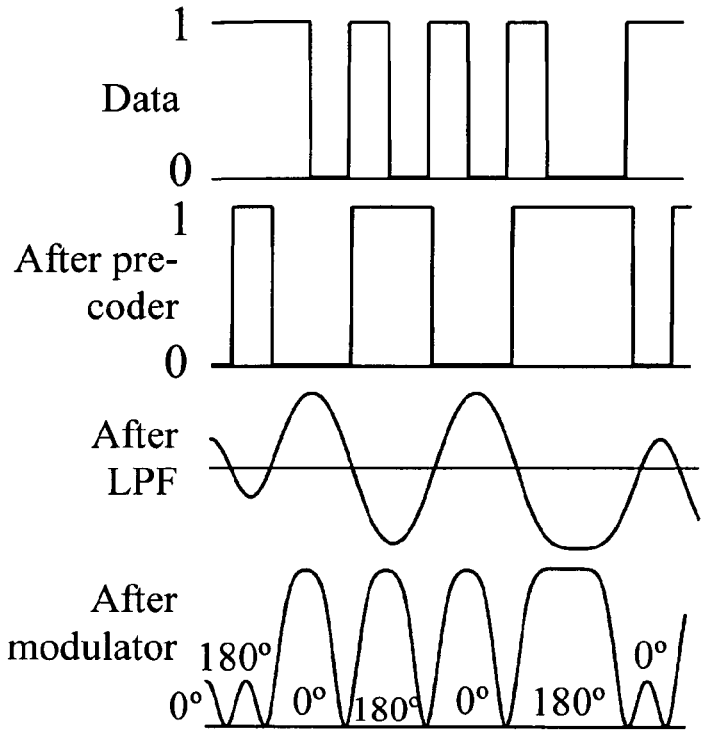
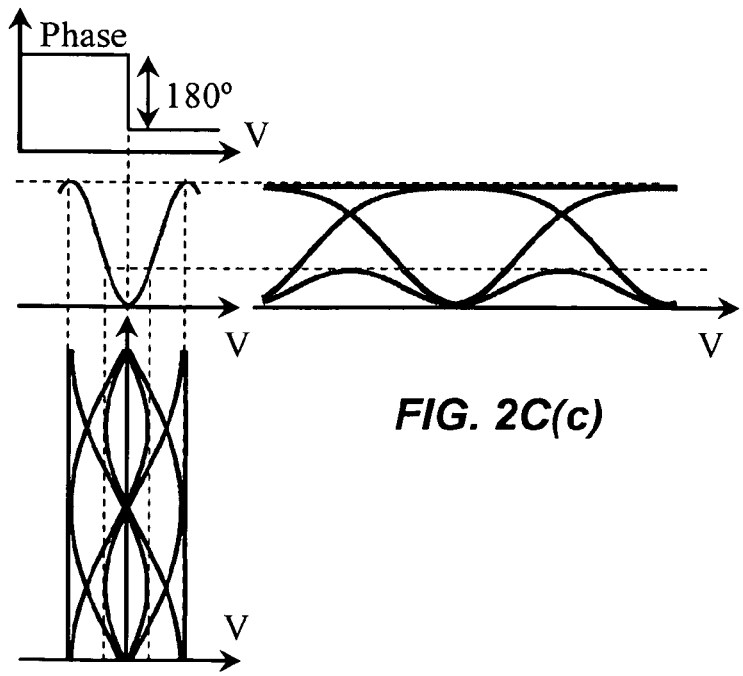

BALANCED PHASE-SHAPED BINARY TRANSMISSION IN OPTICAL COMMUNICATIONS

PRIORITY CLAIM AND RELATED APPLICATION

This application claims the benefits of the U.S. Provisional Application No. 60/980,441 entitled "BALANCED PHASE-SHAPED BINARY TRANSMISSION IN OPTICAL COMMUNICATIONS" and filed Oct. 16, 2007, which is incorporated herein by reference in its entirety.

BACKGROUND

The subject matter of this document relates to optical communications, including apparatus, methods, systems and applications of such apparatus, methods and systems.

Optical communications use an optical modulator to modulate an optical carrier beam to carry digital bits for transmission over an optical link. Optical carriers have broad optical bandwidths that are much greater than the bandwidths of RF and microwave carriers and can use optical wavelength division multiplexing (WDM) to use a single fiber or optical waveguide to transmit multiple optical carriers modulated to carry different optical data channels.

Various optical modulation techniques have been developed for modulating an optical carrier to carry digital data. For example, the binary phase shift keyed (BPSK) modulation modulates an optical carrier to produce different optical power levels to represent logical levels of "0" and "1" with phase shifts of 0 and $\pi$ radians. The phase shifted optical pulses for logical "0" and "1" are decoded at an optical receiver by determining whether the detected signal is to the left or right of a vertical imaginary axis to represent the quadrature phase (Q) component in a signal vector diagram in which the horizontal real axis represents the in-phase (I) component. In some applications, a phase detector can be used to detect the value of the received phase and to determine the logical level of an optical pulse, where a phase value greater than $\pi/2$ corresponds to the logical "0" and a phase value less than $\pi/2$ corresponds to the logical "1." In other applications, the cosine of the phase of the signal can also be detected to determine the logical level of an optical pulse, where a negative cosine value can be used to represent the logical level "0" and a positive cosine value can be used to represent the logical level "1." The BPSK optical signals may use a differentially-encoded phase shift keyed (DeBPSK, or DPSK) modulation format. The DPSK modulation format encodes input data as the difference between two consecutive transmitted symbols. The input data is differentially precoded using the preceding symbol as a reference with an electrical "delay+add" function so that an input data bit of logical "0" or "1" is encoded as a change of carrier phase of 0 or $\pi$ radians relative to the preceding bit. A the receiver side, the above process is reversed by comparing a current bit to the preceding bit.

The Phase-Shaped Binary Transmission (PSBT) format in optical communications is a specialized form of Optical Duobinary (ODB) modulation format, where precoded non-return to zero (NRZ) binary waveforms are electrically low pass filtered to correlate adjacent bits with three logical levels and the resultant 3-level electrical signal is used to drive an optical Mach-Zehnder modulator biased at the null of the transfer function to produce the optical PSBT signal. This encoding process results in the encoding of the signal information in both magnitude and phase. Various PSBT optical systems use direct optical detection at the receiver side to convert the received optical PSBT signal into an electrical signal using a photodetector. Optical PSBT has the advantages of narrow optical bandwidth, high chromatic dispersion bandwidth, reduced electrical bandwidth requirement at the optical transmitter side, and a simplified architecture. Narrow band optical filtering of the PSBT signal has been used to obtain a bandwidth-limited PSBT (BL-PSBT) signal and this technique has been shown to improve the optical signal to noise ratio (OSNR) sensitivity of the received signal. This aspect of optical PBST contrasts the reduced performance observed in some other optical modulation formats e.g. NRZ on and off keying (OOK), Return-to-Zero (RZ)-OOK, NRZ-DPSK, and RZ-DPSK.

SUMMARY

Optical communication apparatus, methods, systems are provided based on balanced-detection phase-shaped binary transmission (BD-PSBT). In one implementation, a method for optical communications includes producing an electrical phase-shaped binary transmission (PSBT) signal with three logical levels to represent a digital data signal to be transmitted; operating an optical Mach-Zehnder modulator to modulate a continuous wave (CW) optical beam based on the electrical PSBT signal to produce an optical transmission signal of optical pulses modulated in amplitude and phase to carry the digital data signal; transmitting the optical transmission signal over an optical link; receiving the optical transmission signal from the optical link; splitting the received optical transmission signal into a first optical signal along a first optical path and a second optical signal along a second optical path; controlling a relative phase delay between the first and second optical signals; and combining the first and second optical signals to produce an optically constructive signal and an optically destructive signal. This method includes operating a first optical detector to convert the optically constructive signal into a first electrical detector output and a second optical detector to convert the optically destructive signal into a second electrical detector output and obtaining a difference between the first and second electrical detector outputs to produce an electrical signal that carries the digital data signal.

In another implementation, an optical communication system is provided to include an optical transmitter module, an optical link in communication with the optical transmitter module and operable to transmit the optical transmission signal and an optical receiver module that is in communication with the optical link to receive the optical transmission signal. The optical transmitter module includes a laser which produces a continuous wave optical beam, a signal generator that produces an electrical phase-shaped binary transmission (PSBT) signal with three logical levels to represent a digital data signal to be transmitted, and an optical Mach-Zehnder modulator to modulate the continuous wave optical beam based on the electrical PSBT signal to produce an optical transmission signal of optical pulses modulated in amplitude and phase to carry the digital data signal. The optical receiver module includes an optical unit and two optical detectors. The optical unit includes an optical splitter to split the received optical transmission signal into a first optical signal and a second optical signal, a first optical path to receive the first optical signal, a second optical path to receive the second optical signal, an optical coupler that combines the first and second optical paths to cause optical interference between the first and second optical path to produce an optically constructive signal and an optically destructive signal, a constructive output port that receives the optically constructive signal, a destructive output port that receives the optically destructive signal, and a mechanism to control a relative phase delay between the first and second optical paths. The first optical detector is provided to convert the optically constructive signal into a first electrical detector output and the second optical detector is provided to convert the optically destructive signal into a second electrical detector output. This optical receiver module also includes an electrical signal combiner in communication with the first and second optical detectors to receive the first and second electrical detector outputs and to produce a difference between the first and second electrical detector outputs as an electrical signal that carries the digital data signal.

In another implementation, a method for detecting an optical phase-shaped binary transmission (PSBT) signal in optical communications includes splitting a received optical PSBT signal into a first optical signal along a first optical path and a second optical signal along a second optical path; controlling a relative phase delay between the first and second optical signals; combining the first and second optical signals to produce an optically constructive signal and an optically destructive signal; operating a first optical detector to convert the optically constructive signal into a first electrical detector output and a second optical detector to convert the optically destructive signal into a second electrical detector output; and obtaining a difference between the first and second electrical detector outputs to produce an electrical signal that carries the digital data signal.

In yet another implementation, an optical receiver for detecting an optical phase-shaped binary transmission (PSBT) signal in optical communication is provided to include an optical unit, first and second optical detectors, and an electrical signal combiner. The optical unit includes an optical splitter to split a received optical PSBT transmission signal of optical pulses modulated in amplitude and phase to carry a digital data signal into a first optical signal and a second optical signal, a first optical path to receive the first optical signal, a second optical path to receive the second optical signal, an optical coupler that combines the first and second optical paths to cause optical interference between the first and second optical path to produce an optically constructive signal and an optically destructive signal, a constructive output port that receives the optically constructive signal, a destructive output port that receives the optically destructive signal, and a mechanism to control a relative phase delay between the first and second optical paths. The first optical detector is used to convert the optically constructive signal into a first electrical detector output and the second optical detector is used to convert the optically destructive signal into a second electrical detector output. The electrical signal combiner is in communication with the first and second optical detectors to receive the first and second electrical detector outputs and to produce a difference between the first and second electrical detector outputs as an electrical signal that carries the digital data signal.

These and other examples and implementations are described in detail in the drawings, the detailed description, and the claims.

BRIEF DESCRIPTION OF DRAWING

FIGS. 2B and 2C illustrate examples of various signals in the measurement system in FIG. 2A.

DETAILED DESCRIPTION

Apparatus, methods and systems described in this document include a modulation format leveraging the reduced bandwidth requirements of Phase-Shaped Binary Transmission (PSBT) and the high optical signal to noise ratio (OSNR) sensitivity of balanced detection. The techniques described in this document can be used in serial 100 Gbps optical communication applications in part owing to the reduced requirements on the transmitter chain, notably the serializer, driver amplifier and modulator. Notably, the techniques described in this document can be used to mitigate various practical limitations of optical modulators with sufficient electric-to-optical bandwidths and driver amplifiers with sufficient bandwidth and output drive levels for high-speed optical communications applications such as 100 Gps systems. For example, 100 Gps systems can be implemented by using driver amplifiers and modulators presently manufactured in volume for 40 Gbps applications while maintaining the high spectral efficiency of PSBT, for example, at or above 0.8 bits/s/Hz.

Figure 1:
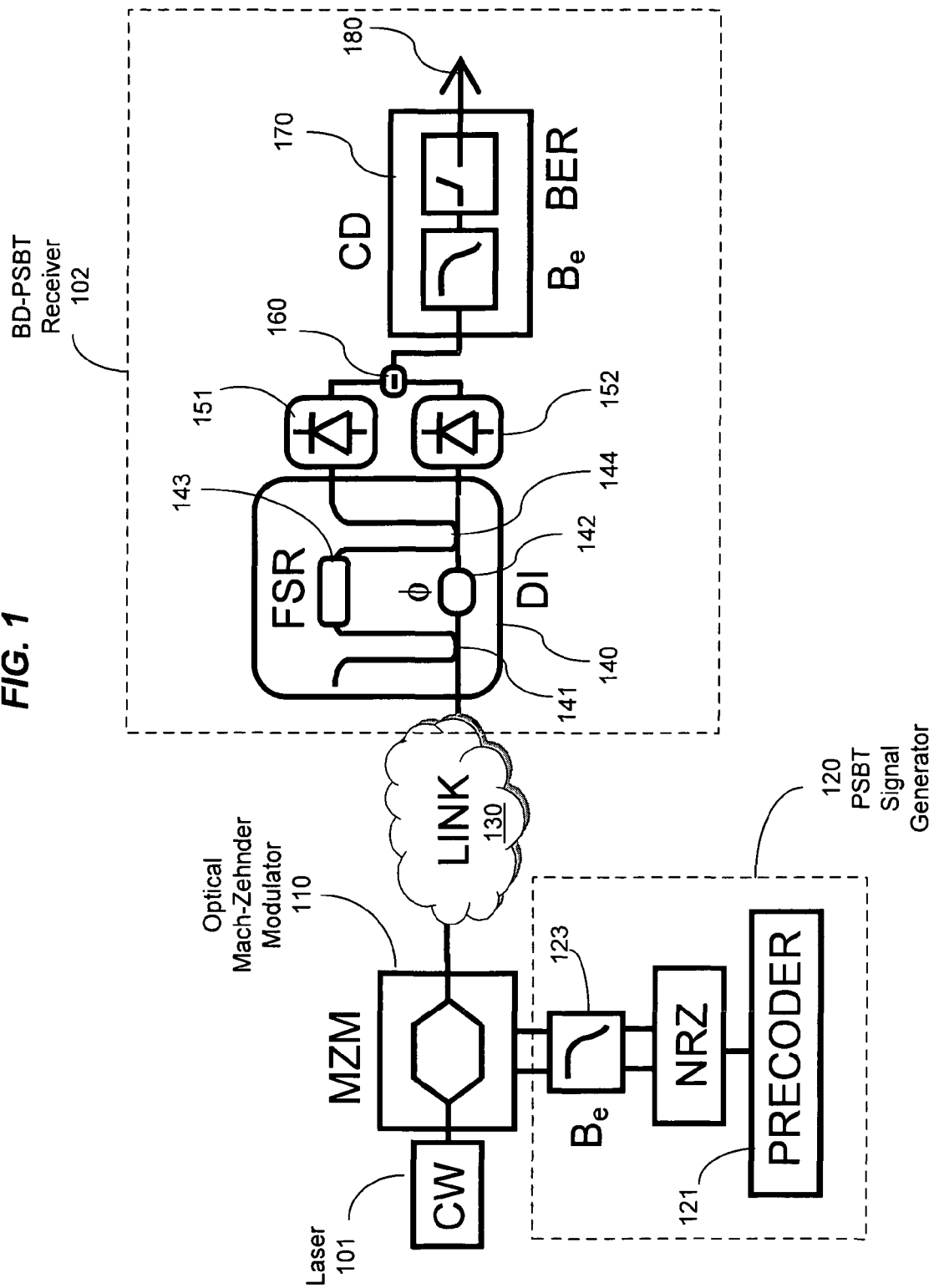
FIG. 1 shows an example of an optical transmission system having a PSBT optical transmitter and a balanced detection receiver module for detecting the PSBT signal.

FIG. 1 shows an example of an optical transmission system having a PSBT optical transmitter and a balanced detection receiver module 102 for detecting the PSBT signal received from an optical link 130 which may be a fiber or a fiber network. This system can provide multiplexing of the optical transmission signal with one or more other optical transmission signals at different optical carrier wavelengths to form a wavelength division multiplexed (WDM) signal. Many optical systems are WDM systems, including dense WDM and ultradense WDM systems.

The PSBT optical transmitter module includes a laser 101 which produces a continuous wave optical beam, an electronic PSBT signal generator 120 that produces an electrical phase-shaped binary transmission (PSBT) signal with three logical levels to represent a digital data signal to be transmitted, and an optical Mach-Zehnder modulator (MZM) 110 to modulate the continuous wave optical beam based on the electrical PSBT signal to produce the optical transmission signal of optical pulses modulated in amplitude and phase to carry the digital data signal. In this example, the electronic PSBT signal generator 120 includes a precoder 121 which can be a exclusive-or encoder to encode the binary bits of the digital signal in producing the electrical PSBT signal. The initial binary digital signal is in the non-return-to-zero (NRZ) format. A low pass electronic filter 123 is used to filter the output of the precoder 121 to produce the electrical PSBT signal. An optical modulator driver circuit applies a modulation control signal to the MZM 110 in response to the electrical PSBT signal to modulate the optical beam.

The optical receiver module 102 is in communication with the optical link 130 to receive the optical transmission signal and includes an optical unit 140 such as an optical delay interferometer (DI). The delay line interferometer can be realized in bulk optics, fiberoptics, fiber Bragg gratings (FBGs), planar lightwave circuits (PLCs). This unit 140 includes an optical splitter 141 to split the received optical transmission signal into a first optical signal and a second optical signal, a first optical path to receive the first optical signal, a second optical path to receive the second optical signal, an optical coupler 144 that combines the first and second optical paths to cause optical interference between the first and second optical path to produce an optically constructive signal and an optically destructive signal. A constructive output port is provided to receive the optically constructive signal and a destructive output port is provided to receive the optically destructive signal. A mechanism is provided to control a relative phase delay between the first and second optical paths and can be a variable optical delay device 142 or 143.

The optical receiver module 102 also includes a first optical detector 151 to convert the optically constructive signal into a first electrical detector output and a second optical detector 152 to convert the optically destructive signal into a second electrical detector output. An electrical signal combiner 160 is provided in communication with the first and second optical detectors 151 and 152 to receive the first and second electrical detector outputs and to produce an electrical signal that represents a difference between the first and second electrical detector outputs and carries the digital data signal embedded in the optical signal received by the receiver module 102. A detection circuit 170 can be provided to provide clock recovery and data extraction functions and produce output digital bits in a digital output signal 180.

The detection circuit 170 can be used to provide a measurement of the signal quality of the digital output signal 180. For an optical system with filters, the effective concatenated bandwidth of the filters induces intersymbol interference (ISI). The ISI causes distortion of the signal and reduces the decision quality, which is the ability to accurately detect whether a bit is a logical "1" or "0," at a receiver. This decision quality may be quantified by counting the number of error bits and dividing it by the total number of transmitted bits. The resulting ratio is referred to as a bit error ratio (BER). Another way of characterizing the quality of the signal at the receiver involves translating the BER into a signal quality factor Q. The distortion effect of ISI on signal quality may be viewed in a general way in a baseband eye diagram of the modulated signal where ISI causes the space between "1" and "0" symbol levels to be partially filled by the trailing and leading edges of the symbols. One way of visualizing/displaying the impact of ISI by way of an eye diagram.

The signal generator 120 at the transmitter side of the system in FIG. 1 and the MZM driver for the MZM 140 on the receiver side can include electronic components with an operating signal bandwidth less than one half or one third of a data rate of the digital signal to produce the electrical PSBT signal. Assuming R is a data rate of the digital signal, the optical unit 140 is configured to have a free spectral range (FSR) of the optically constructive signal or the optically destructive signal greater than R and less than 2 R. The relative delay between the first and second optical paths in the MZM 140 is approximately the inverse of the FSR. In some applications, the free spectral range can be set approximately at 1.5 R to enhance the readout performance.

Figure 2A:
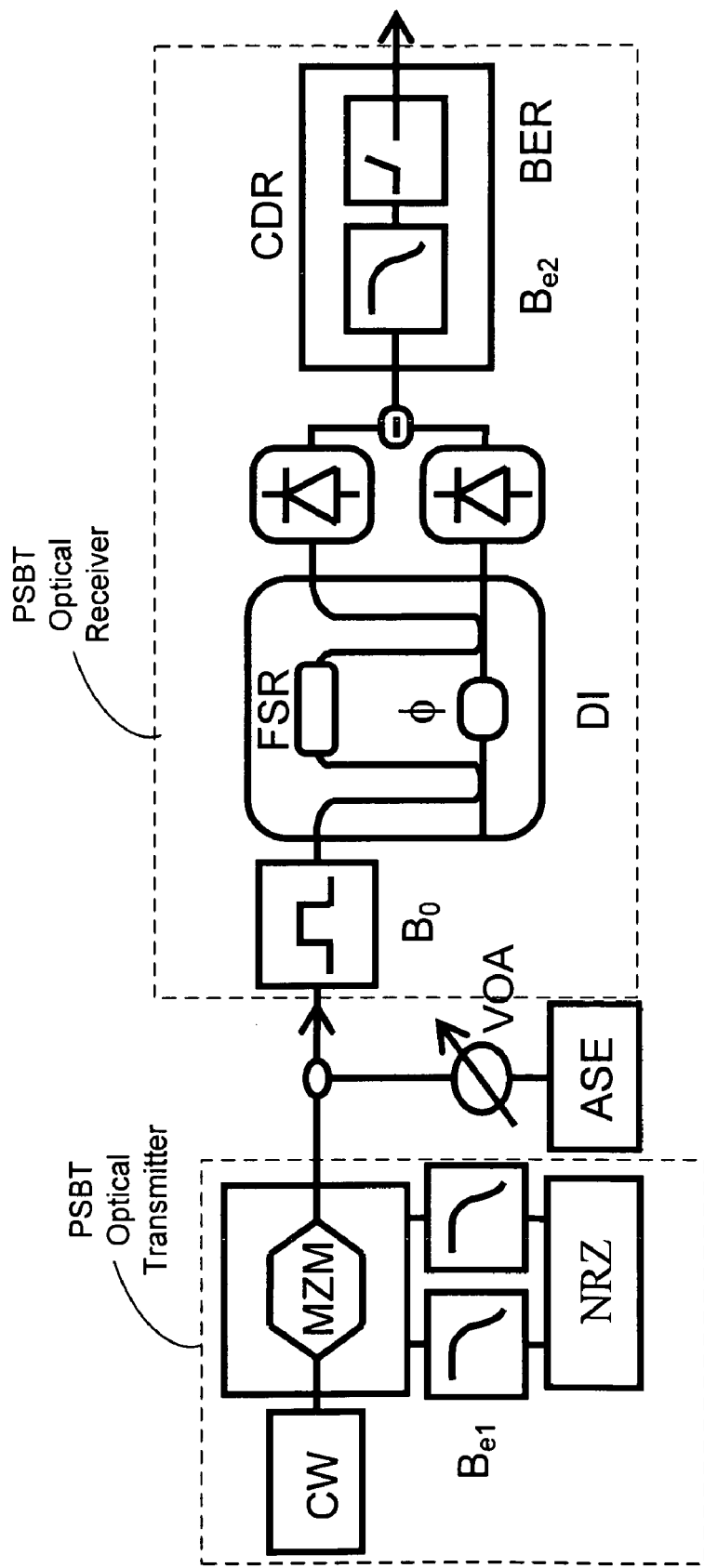
FIG. 2A shows an experimental system based on the design in FIG. 1 for conducting experiments a line rate R of 42.8 Gbps.

FIG. 2A shows an experimental system based on the design in FIG. 1 for conducting experiments a line rate R of 42.8 Gbps. Light from a continuous-wave (CW) laser was modulated using a Mach-Zehnder modulator (MZM) in a "push-pull" configuration (biased a null of transmission and with $\pm V\pi$ drive swing for both arms). The MZM was driven by a 43 Gbps NRZ electrical data sequence from a pseudo-random bit stream (PRBS) of length $2^{31}-1$. For PSBT and BD-PSBT, a transmit electrical bandwidth, $B_{e1}$, of 0.25 R was used. For DPSK, $B_{e1}$=0.5 R was used. The optical signal-to-noise ratio (OSNR) was set by adding optical amplified spontaneous emission (ASE) noise from a broadband ASE source. The OSNR was set to 17 dB (reported in 0.1 nm resolution bandwidth).

At the receiver side, the ASE was filtered by an optical filter. Three optical filter configurations were used. The first optical filer configuration was a 75 GHz flat-top filter. The second optical filter configuration was a combination of two 50 GHz interleavers concatenated with the 75 GHz flat-top filter. In simulation, these three filter configurations were assumed to have a second-order Gaussian with 3 dB bandwidths Bo of 0.79 R for a pair of interleavers in combination with a flat top filter, 0.94 R for an 1 interleaver and a flat top filter and 1.75 R for a flat top filter only.

For DPSK, a delay-line interferometer (DI) with a normalized FSR over the bit rate R very close or equal to FSR/R=1 was used. For the BD-PSBT, a normalized FSR of FSR/R=1.51, or in absolute units FSR=65 GHz, was used. The two outputs of the DI were detected by a balanced photodetector. The photodetector output was coupled to a clock-and-data recovery (CDR) module. The bit-error ratio (BER) was reported through a BER analyzer. In simulation, the electrical transfer function of the receiver was considered to be a fourth-order Bessel-Thompson with 3 dBe bandwidth of $Be_2$=0.6 R (25 GHz), which is consistent with modeling parameters used in other studies.

A Monte-Carlo numerical model using error counting was used to evaluate the system performance. A PRBS length of $2^{11}$ (repeated 2 times before mixing with ASE noise) was used and errors were accumulated over 200 different noise seeds. The optimum time sampling point was found and the BER versus decision threshold level was swept. To account for phase noise from the CDR, a receiver box time window of ±10% of the bit duration has been assumed. Electrical Q (in dB) was calculated from the BER value using the relationship: Q=20 log $[\sqrt{2}\mathrm{erfc}^{-1}(2\mathrm{BER})]$ where $\mathrm{erfc}^{-1}$ is the inverse complementary error function. The model was verified against results found in the literature as well as experimental observations.

One of advantages of the present data transmission format is the reduced transmitter bandwidth (electrical and electro-optical) requirement compared to DPSK while maintaining much of the performance benefit of DPSK. The electrical-to-optical waveforms are illustrated in FIGS. 2B and 2C. The proposed BD-PSBT is similar to DPSK in that an exclusive-or pre-coder is used and the modulator is driven to $2V\pi$ while biased at the null of the transfer function. In the case of DSPK, the precoder serves to create the relationship between adjacent bits that will be decoded at the Rx side by the (1 bit) DI demodulator. For the BD-PSBT Tx, the precoding is not strictly required, but serves to avoid long strings of errors due to a single error in recovery. More importantly, the two differ greatly in the bandwidth requirements of the components used in the Tx chain. For DPSK, the transmitter bandwidth requirement is generally accepted to be $\geq 0.5$ R, preferable larger than 0.7 R (or 55 GHz and 77 GHz in absolute terms at R=110.3 Gbps). For BD-PSBT, the transmit bandwidth can be reduced to less than 0.2 R (or 22 GHz in absolute terms at R=110.3 Gbps). This allows the use of standard 40 G driver amplifiers and modulators at 100 G, removing a significant implementation roadblock.

FIGS. 2B and 2C illustrate examples of various signals for the setup in FIG. 2A. FIG. 2B(a) shows the electrical data waveform of the digital signal. FIG. 2B(b) shows the precoded electrical waveform. FIG. 2B(c) shows the electrical waveform after the electrical low pass filter 123. FIG. 2B(d) shows the transmit optical waveform and the associated phase of the optical waveform. FIG. 2C(a) shows the transfer function of the MZM biased at the null of the transfer function. FIG. 2C(b) shows the electrical eye diagram for the modulator drive signal, and FIG. 2C(c) shows the resulting modulated optical eye diagram.

In another aspect, the BD-PSBT differs from the DPSK in that, while it can be implemented by using the balanced detection to improve the noise statistics (similar to DPSK), such BD-PSBT implementation may not require the 1-bit delay decoding function. The two formats can be viewed in a unified way by considering that the reduced Tx BW of BD-PSBT creates correlation between adjacent bits due to the low pass filtering properties, effectively moving the decoding function into the Tx (allowing direct detection for standard PSBT). Note that direct detection of DPSK signals has been shown using optical filters to turn the DPSK signal into a quasi-PSBT signal. Narrowband ($B_0 < R$) optical filters may be used to introduce correlation between adjacent bits, eliminating the need for the DI. However, the detection performance may be degraded when the balanced detection is not used.

Figure 3:
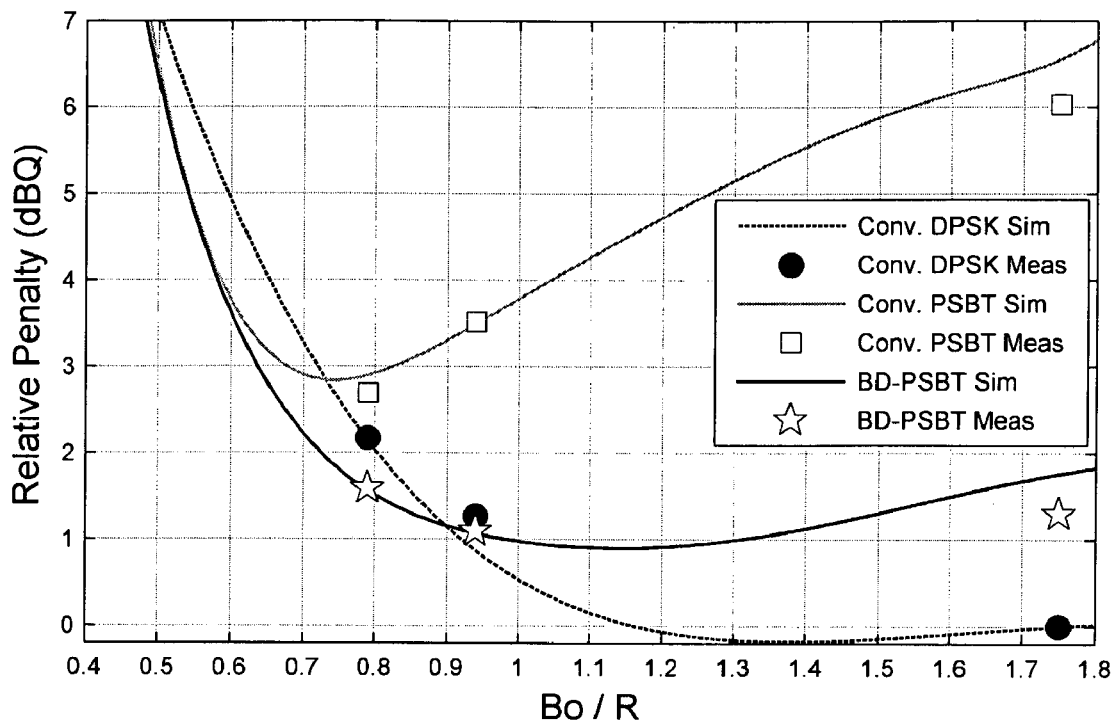
FIG. 3 shows the values of the relative Q penalty as a function of normalized optical filter bandwidth BO/R based on measurements from the setup in FIG. 2A, where the conventional DPSK is represented by the dotted line and filled circles, conventional PSBT is represented by gray line and squares and BD-PSBT is represented by solid black line and stars. The lines are from simulations and points are from the measurements.

FIG. 3 compares the performance of the present BD-PSBT format to standard PSBT and DPSK formats as a function of effective optical filter bandwidth Bo of the link. From the measured and simulated BER, the absolute Q was calculated. Then the relative Q penalty was calculated by referencing the Q to the case of conventional DPSK at large $B_0$ ($B_0/R=1.75$ for the simulated and measured curves). BD-PSBT outperforms standard PSBT for all $B_0/R > 0.6$ and outperforms DPSK for $B_0/R < 0.9$. Comparing both optima, the improvement is close to 2 dBQ (translating to >2.7 dB of OSNR) given by BD-PSBT over PSBT. While DPSK clearly outperforms BD-PSBT for large optical filter bandwidths (>0.9 $B_0/R$), BD-PSBT provides comparable or better performance for relevant deployment bandwidths. Note that for 110.34 Gbps (64B/66B line rate plus 7% FEC overhead), a point to point link with typical 200 GHz DWDM interleavers may have an effective $B_0/R$ of 1.5. The BD-PSBT will outperform PSBT by 5 dBQ (more than 6 dB of OSNR). A typical link with 100 GHz DWDM interleavers at Tx and Rx may have an effective $B_0/R$ of 0.76. At that point, the BD-PSBT will outperform PSBT by 1.2 dBQ translating to 1.6 dB of OSNR improvement.

From the above measurements and simulations, the present BD-PSBT modulation format for serial 100 Gbps transmission can be implemented in a simple configuration and can utilize existing technologies. Such BD-PSBT format exhibits a reduced Tx bandwidth (electrical and electro-optical) requirement, significantly easing practical implementation at 100 G. Good spectral efficiency (capable of 1 bit/s/Hz) and better OSNR sensitivity was demonstrated versus traditional PSBT by 2 dB.

Figure 4:
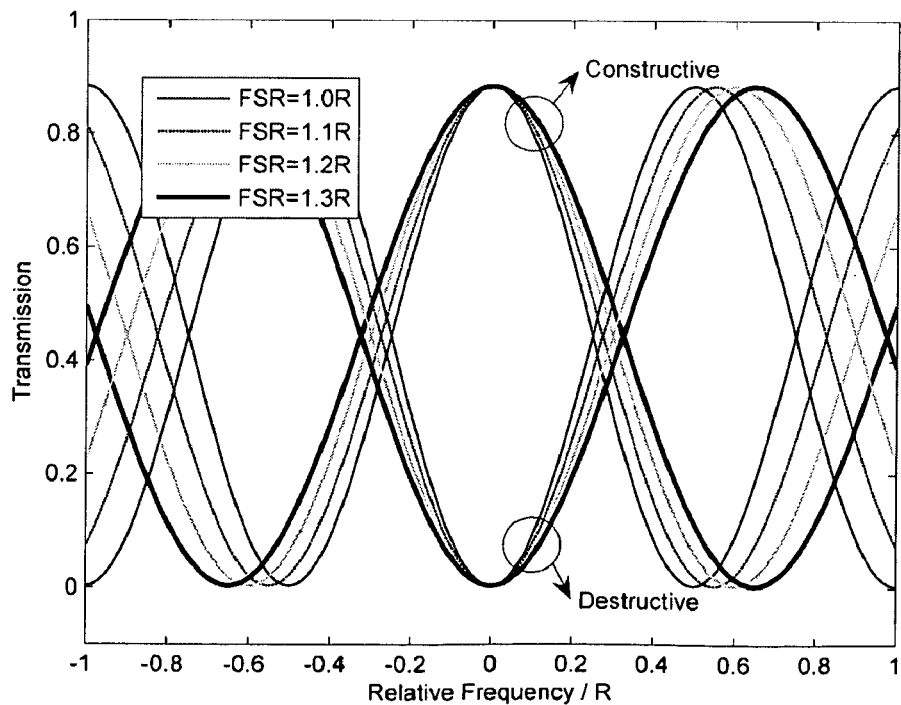
FIG. 4 shows a relationship between the free spectral range (FSR) and the optical bandwidth for a delay line interferometer in FIG. 1.

FIG. 4 shows a relationship between FSR and optical bandwidth for the delay line interferometer 140 in FIG. 1. The delay difference produces the transfer function having a sinusoidal amplitude response (in the frequency domain) from the input port to each output port. The spectral period of a cycle of the transfer function is the free spectral range (FSR). The sinusoidal width proportional to the FSR effectively limits the frequency band of the signals that can be passed from the DLI input to the constructive and destructive outputs. The phase of the frequency domain cycle of the transfer function is the FSR phase.

Figure 5:
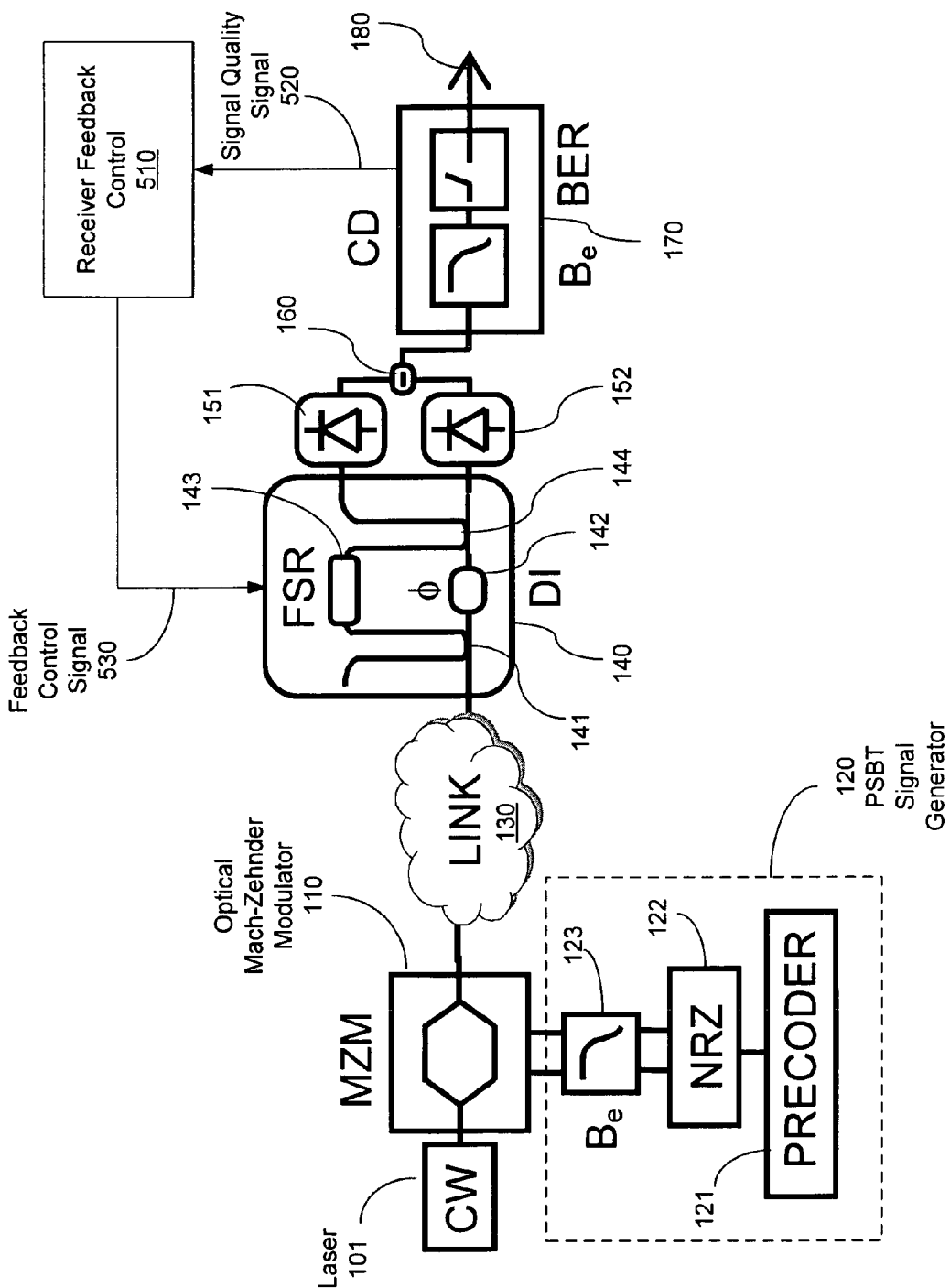
FIG. 5 shows a feedback control in the balanced detection receiver module for detecting the PSBT signal in the system in FIG. 1.

FIG. 5 shows another BD-PSBT system where a feedback control unit 510 is provided to generate a feedback control signal 530 in response to a signal quality signal 520 produced by the circuit 170, e.g., the BER. The feedback control 510 is applied to the optical delay interferometer 140 to control the two optical paths. The detection circuit 170 is used to measure a signal quality in the electrical signal 180. The measured signal quality is used as a feedback signal to control at least one of the first and second optical paths of the optical delay interferometer 140 to improve the signal quality.

In the examples in FIGS. 1 and 5, the PSBT is generated in the electrical domain and is then applied to control the optical modulation of the MZM 100. Alternatively, the PSBT optical signal can be generated by using an optical DPSK transmitter to produce a DPSK encoded signal and passing the optical DPSK signal through one or multiple optical filters to turn the signal into an optical PSBT signal. Such optical filters can be located at the transmitter side, in the link or at the receiver side.

Figure 6:
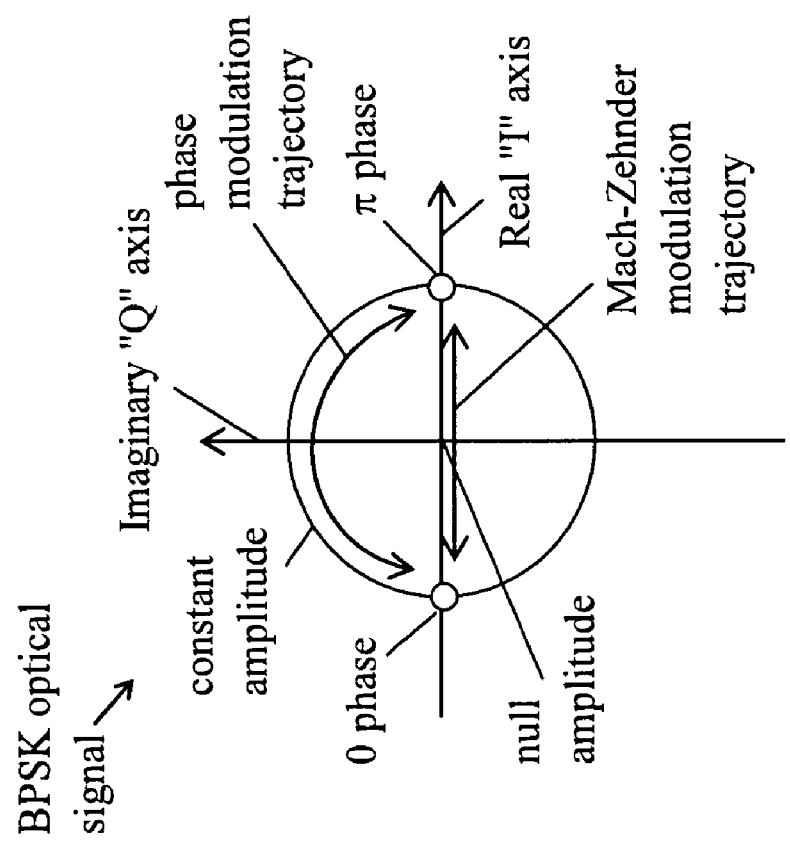
FIG. 6 shows an example of IQ phasor diagram for a DPSK signal.

FIG. 6 is an exemplary vector representation of a BPSK signal of "1" or "0" having constellation points with a phase of either 0 or π, respectively. Of course, any two phases that are separated by π may be used to represent "1" and "0".

Figure 7:
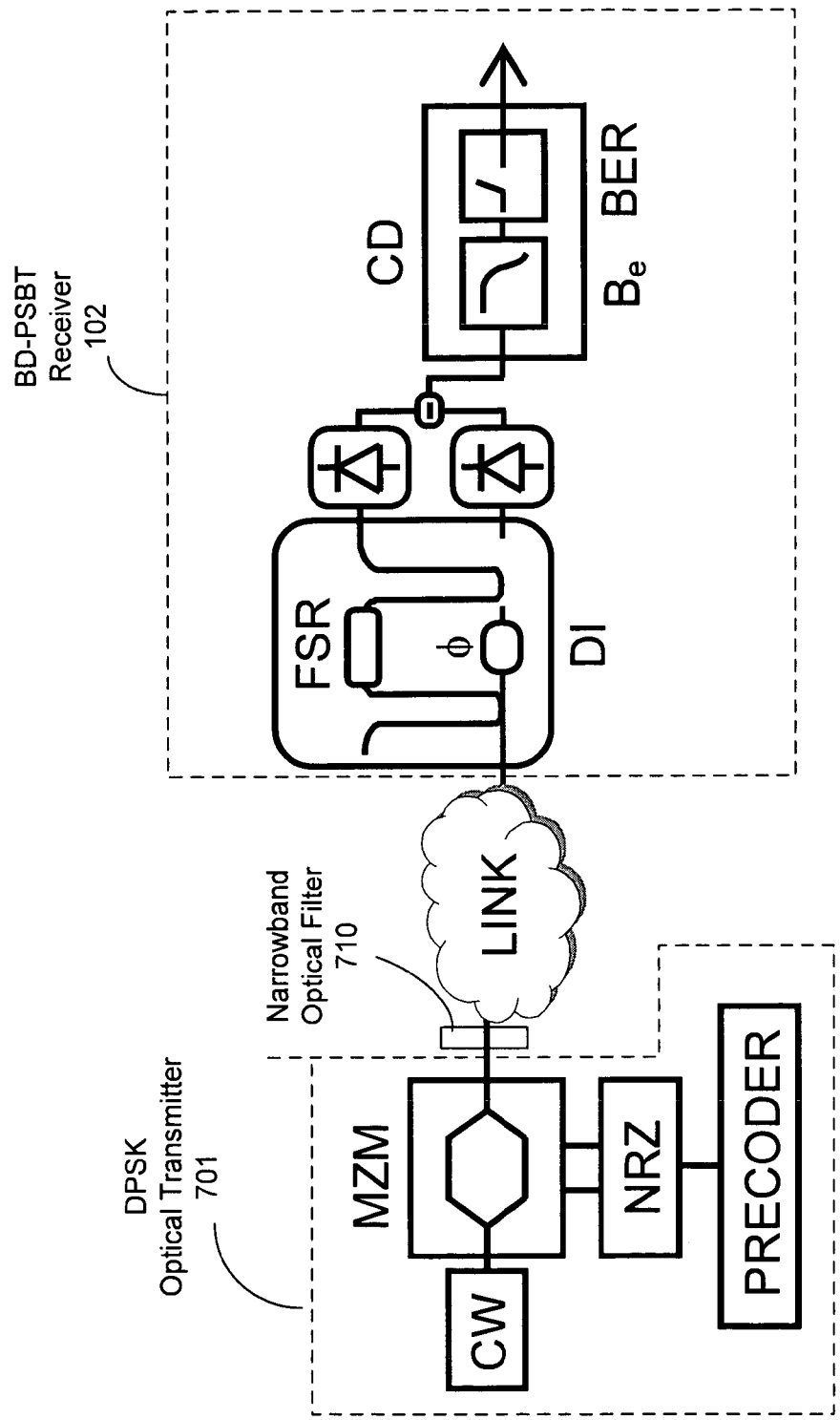
FIG. 7 shows another example of an optical transmission system that uses a DPSK optical transmitter and narrowband optical filtering to produce a PSBT optical transmission signal and a balanced detection receiver module for detecting the PSBT signal as shown in FIG. 1.
Figure 8:
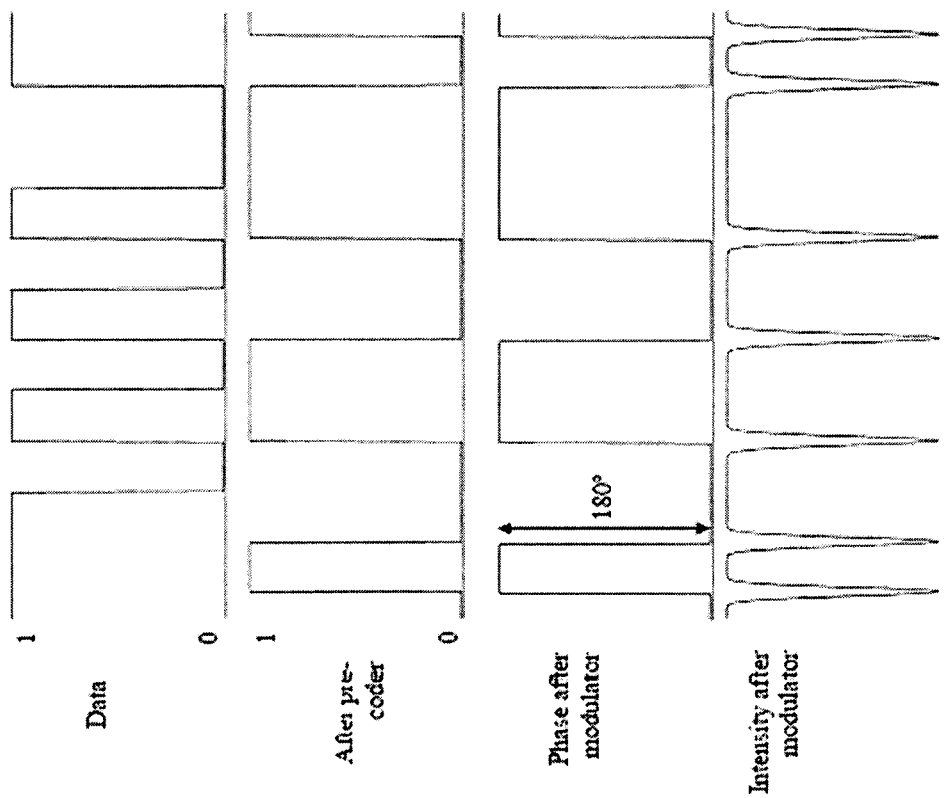
FIG. 8 illustrate examples of various signals in the DPSK optical transmitter in the system in FIG. 7.

FIG. 7 shows an example of a BD-PSBT system using a DPSK transmitter 701 and a narrowband optical filter 710 in the output path to produce the optical PSBT signal for transmission over the receiver side. FIG. 8 shows various signals in the DPSK transmitter 701. In this example, the DPSK Tx electrical waveform is a 2-level signal and the DPSK Tx optical waveform is a constant intensity waveform, where the 2-level electrical waveform has been mapped to 2 phases in the optical signal.

The above examples are described in the context of the NRZ Balanced-PSBT. The BD-PSBT format in this document can also be applicable to other data formats, including the return to zero (RZ) variants (i.e. RZ Balanced-PSBT). This can be accomplished by carving with a nominally sinusoidal waveform of 0.5 Rb, driving a MZM with nominal 2 Vpi. The MZM can be biased at the peak or the null of the transfer function. As another example, the RZ implementation also be accomplished by carving with a nominally sinusoidal waveform of Rb, and driving a MZM with a nominal Vpi. The MZM can be biased at a nominal quadrature point of the transfer function.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations, enhancements and other implementations can be made based on what is described and illustrated in this document.

What is claimed is:

1. A method for optical communications, the method comprising:
producing an electrical phase-shaped binary transmission (PSBT) signal with three logical levels to represent a digital data signal to be transmitted;
operating an optical Mach-Zehnder modulator to modulate a continuous wave optical beam based on the electrical PSBT signal to produce an optical transmission signal of optical pulses modulated in amplitude and phase to carry the digital data signal;
transmitting the optical transmission signal over an optical link;
receiving the optical transmission signal from the optical link;
splitting the received optical transmission signal into a first optical signal along a first optical path and a second optical signal along a second optical path;
controlling a relative phase delay between the first and second optical signals;
combining the first and second optical signals to produce an optically constructive signal and an optically destructive signal, said controlling the relative phase delay comprising controlling at least one of the first and second optical paths to set a free spectral range of the optically constructive signal or the optically destructive signal to be between R and 2R, where R is a data rate of the digital signal;
operating a first optical detector to convert the optically constructive signal into a first electrical detector output and a second optical detector to convert the optically destructive signal into a second electrical detector output; and
obtaining a difference between the first and second electrical detector outputs to produce an electrical signal that carries the digital data signal.

2. The method as in claim 1, comprising:
controlling the electrical PSBT signal to have a signal bandwidth less than one half of a data rate of the digital signal.

3. The method as in claim 2, comprising:
using an electronic component with an operating signal bandwidth less than one half of the data rate of the digital signal to produce the electrical PSBT signal.

4. The method as in claim 2, comprising:
using an electronic circuit with an operating signal bandwidth less than one half of the data rate of the digital signal to drive the optical Mach-Zehnder modulator based on the electrical PSBT signal in producing the optical transmission signal.

5. The method as in claim 2, comprising:
operating the optical Mach-Zehnder modulator at a signal bandwidth less than one half of the data rate of the digital signal.

6. The method as in claim 1, whereby said controlling the at least one of the first and second optical paths causes the free spectral range of the optically constructive signal or the optically destructive signal to be approximately 1.5 R.

7. A method for optical communications, the method comprising:
producing an electrical phase-shaped binary transmission (PSBT) signal with three logical levels to represent a digital data signal to be transmitted;
operating an optical Mach-Zehnder modulator to modulate a continuous wave optical beam based on the electrical PSBT signal to produce an optical transmission signal of optical pulses modulated in amplitude and phase to carry the digital data signal;
multiplexing the optical transmission signal with one or more other optical transmission signals at different optical carrier wavelengths to form a wavelength division multiplexed (WDM) signal that combines the optical transmission signal and the one or more other optical transmission signals at different optical carrier wavelengths;
transmitting the WDM signal over an optical link;
receiving the WDM signal from the optical link;
de-multiplexing the received WDM signal to uncombined the optical transmission signal from the one or more other optical transmission signals at the different optical carrier wavelengths;
splitting the uncombined optical transmission signal into a first optical signal along a first optical path and a second optical signal along a second optical path;
controlling a relative phase delay between the first and second optical signals;
combining the first and second optical signals to produce an optically constructive signal and an optically destructive signal;
operating a first optical detector to convert the optically constructive signal into a first electrical detector output and a second optical detector to convert the optically destructive signal into a second electrical detector output; and
obtaining a difference between the first and second electrical detector outputs to produce an electrical signal that carries the digital data signal.

8. A method for optical communications, the method comprising:
producing an electrical phase-shaped binary transmission (PSBT) signal with three logical levels to represent a digital data signal to be transmitted, said producing the electrical PSBT signal comprising
operating an exclusive-or encoder to encode binary bits of the digital data signal, and
performing a low pass filtering on an output of the exclusive-or encoder;
operating an optical Mach-Zehnder modulator to modulate a continuous wave optical beam based on the electrical PSBT signal to produce an optical transmission signal of optical pulses modulated in amplitude and phase to carry the digital data signal;
transmitting the optical transmission signal over an optical link;
receiving the optical transmission signal from the optical link;
splitting the received optical transmission signal into a first optical signal along a first optical path and a second optical signal along a second optical path;
controlling a relative phase delay between the first and second optical signals;

combining the first and second optical signals to produce an optically constructive signal and an optically destructive signal;

operating a first optical detector to convert the optically constructive signal into a first electrical detector output and a second optical detector to convert the optically destructive signal into a second electrical detector output; and obtaining a difference between the first and second electrical detector outputs to produce an electrical signal that carries the digital data signal.

9. A method for optical communications, the method comprising:

producing an electrical phase-shaped binary transmission (PSBT) signal with three logical levels to represent a digital data signal to be transmitted, said producing the electrical PSBT signal comprising directly performing a low pass filtering on the digital signal, without encoding digital bits of the digital signal prior to the low pass filtering;

operating an optical Mach-Zehnder modulator to modulate a continuous wave optical beam based on the electrical PSBT signal to produce an optical transmission signal of optical pulses modulated in amplitude and phase to carry the digital data signal;

transmitting the optical transmission signal over an optical link;

receiving the optical transmission signal from the optical link;

splitting the received optical transmission signal into a first optical signal along a first optical path and a second optical signal along a second optical path;

controlling a relative phase delay between the first and second optical signals;

combining the first and second optical signals to produce an optically constructive signal and an optically destructive signal;

operating a first optical detector to convert the optically constructive signal into a first electrical detector output and a second optical detector to convert the optically destructive signal into a second electrical detector output; and obtaining a difference between the first and second electrical detector outputs to produce an electrical signal that carries the digital data signal.

10. The method as in claim 9, wherein:
the digital signal is in a non-return-to-zero (NRZ) format.

11. The method as in claim 9, wherein:
the digital signal is in a return-to-zero (RZ) format.

12. An optical communication system comprising:

an optical transmitter module comprising a laser which produces a continuous wave optical beam, a signal generator that produces an electrical phase-shaped binary transmission (PSBT) signal with three logical levels to represent a digital data signal to be transmitted, and an optical Mach-Zehnder modulator to modulate the continuous wave optical beam based on the electrical PSBT signal to produce an optical transmission signal of optical pulses modulated in amplitude and phase to carry the digital data signal;

an optical link in communication with the optical transmitter module and operable to transmit the optical transmission signal;

an optical receiver module in communication with the optical link to receive the optical transmission signal, the optical receiver comprising:

an optical unit comprising an optical splitter to split the received optical transmission signal into a first optical signal and a second optical signal, a first optical path to receive the first optical signal, a second optical path to receive the second optical signal, an optical coupler that combines the first and second optical paths to cause optical interference between the first and second optical path to produce an optically constructive signal and an optically destructive signal, a constructive output port that receives the optically constructive signal, a destructive output port that receives the optically destructive signal, and a mechanism to control a relative phase delay between the first and second optical paths, such that a free spectral range of the optically constructive signal or the optically destructive signal is between R and 2R, where R is a data rate of the digital signal;

a first optical detector to convert the optically constructive signal into a first electrical detector output;

a second optical detector to convert the optically destructive signal into a second electrical detector output; and an electrical signal combiner in communication with the first and second optical detectors to receive the first and second electrical detector outputs and to produce a difference between the first and second electrical detector outputs as an electrical signal that carries the digital data signal.

13. The system as in claim 12, wherein:
the signal generator includes electronic components with an operating signal bandwidth less than one half of a data rate of the digital signal to produce the electrical PSBT signal with a signal bandwidth less than one half of the data rate of the digital signal.

14. The system as in claim 13, comprising:
an electronic circuit with an operating signal bandwidth less than one half of the data rate of the digital signal to drive the optical Mach-Zehnder modulator based on the electrical PSBT signal in producing the optical transmission signal.

15. The system as in claim 12, wherein
the optical unit is configured to have the free spectral range approximately at 1.5 R.

* * * * *